United States Patent [19]

Epel et al.

[11] 4,196,926
[45] Apr. 8, 1980

[54] ENERGY ATTENUATOR AND METHOD OF MANUFACTURING THEREOF

[75] Inventors: Joseph N. Epel, Southfield; Malcolm K. McDougall, Sterling Heights; Robert E. Wilkinson, Birmingham, all of Mich.

[73] Assignee: The Budd Company, Troy, Mich.

[21] Appl. No.: 881,305

[22] Filed: Feb. 27, 1978

[51] Int. Cl.² ............................................. B60R 19/06
[52] U.S. Cl. .................................. 293/136; 188/1 B; 267/140
[58] Field of Search ............................ 188/1 B, 1 C; 267/139–141; 293/133, 135, 136

[56] References Cited

U.S. PATENT DOCUMENTS

| 2,827,280 | 3/1958 | Burkhalter | 267/140 |
| 3,337,207 | 8/1967 | Christiansson | 267/139 |
| 3,563,525 | 2/1971 | Narabu | 267/140 |
| 3,698,440 | 10/1972 | Matthieu et al. | 188/1 B X |
| 3,734,557 | 5/1973 | McKenzie | 267/140 X |
| 3,999,795 | 12/1976 | Roubinet | 267/139 X |

*Primary Examiner*—Duane A. Reger
*Attorney, Agent, or Firm*—A. L. Trueax, Jr.

[57] ABSTRACT

An energy attenuator for absorbing impact of a foreign object against a body to be protected. The energy attenuator comprising a plurality of layers in a desired form or shape and each layer may be separated from the adjacent layer by films of high temperature resistant thermoplastic materials, which are neither soluble in nor compatible with or modified by the molding conditions encountered in processing the laminates or layers. The energy attenuator may be manufactured by either a buildup process whereby each layer is formed, then separated by a separating material, another layer is then deposited upon the material forming a laminate structure which may be made to the desired thickness by continually forming layers with separators between each layer or the separate layers may be formed individually and then assembled by stacking them into a laminated structure.

5 Claims, 8 Drawing Figures

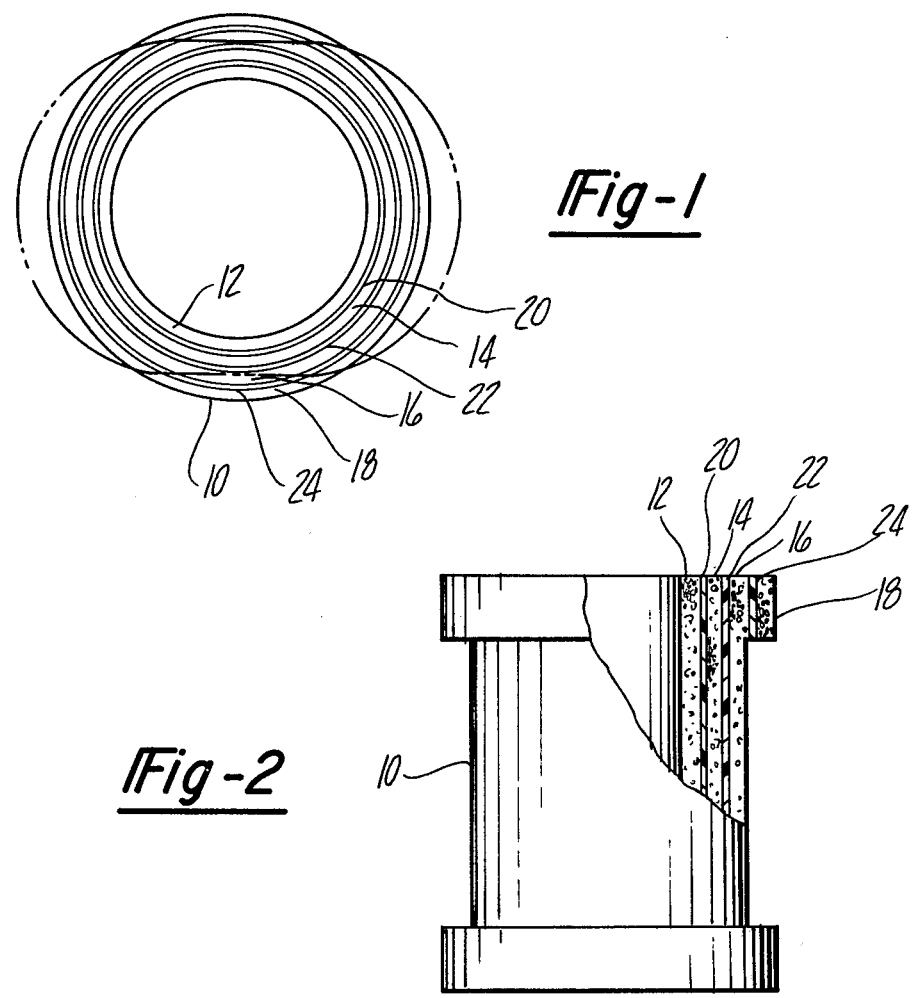
Fig-1
Fig-2
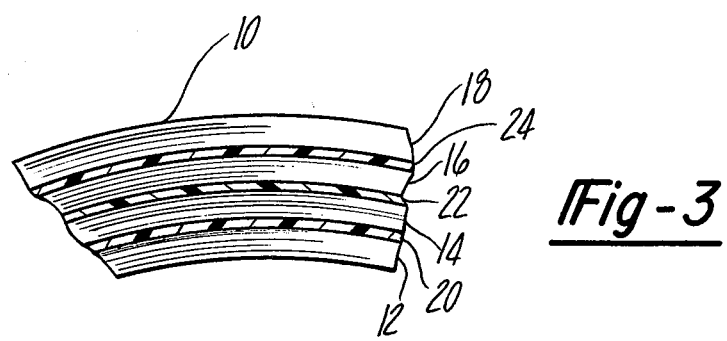
Fig-3

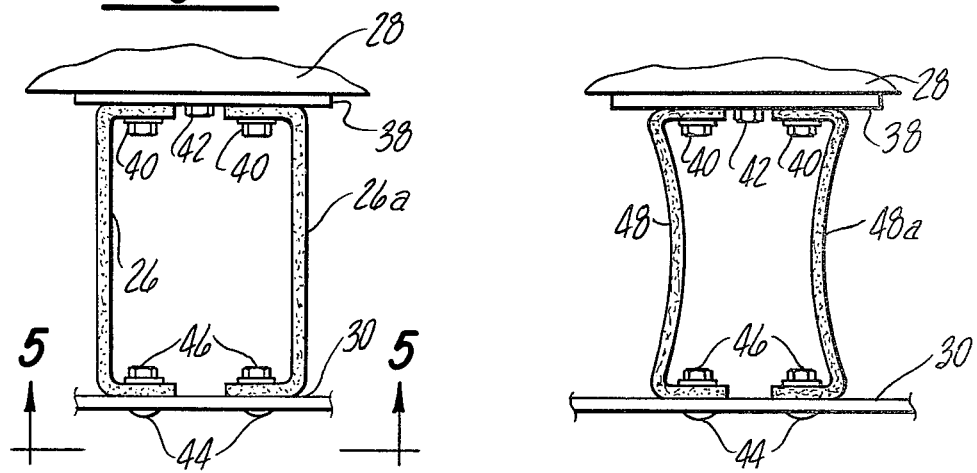
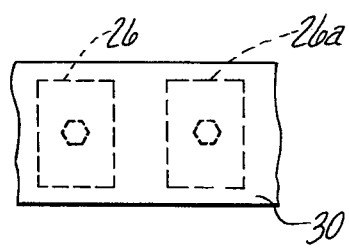
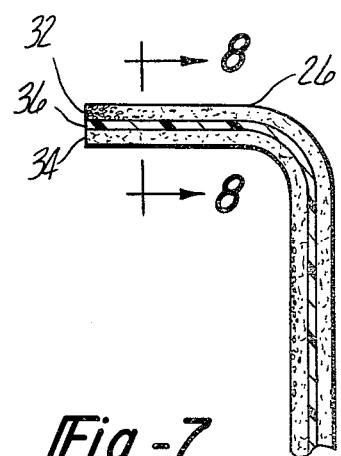
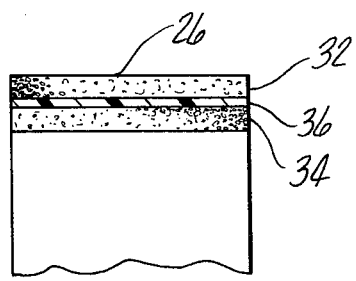

ENERGY ATTENUATOR AND METHOD OF MANUFACTURING THEREOF

BACKGROUND OF THE INVENTION

Attenuating devices for bumpers have taken a wide variety of different forms. Some such devices have involved piston cylinder arrangements using flowable liquids. Other devices have included collapsible members and resilient members which collapse upon impact and then restore to their original shapes after the impact, absorbing slight energy during such collapsing.

In recent years, much emphasis has been placed on the development of bumpers capable of withstanding a five mile per hour impact without damaging the vehicle or object it is protecting. In the main, devices to accomplish this have been relatively heavy and expensive to manufacture or otherwise, unsuitable for mass production.

A patent application for a bumper spring U.S. Ser. No. 766,462 filed by Epel and Wilkinson discloses a solid bumper spring which is effective in deforming under impact force and restoring to its original shape when the impact forces are removed, but the effectiveness in absorbing the impact forces is reduced by each impact. An object of the present invention is to provide an energy attenuator for repeatedly absorbing impact forces over a defined deflection distance with a relatively constant absorption efficiency.

A patent to Roubinet U.S. Pat. No. 3,999,793 discloses an energy absorbing bumper formed by a winding operation of glass filament impregnated with polymerizable resin about a core, polymerizing the resin, and then cutting the loop into two pieces to form two bumpers. The bumpers formed from this method would be substantially solid beams. Another object of this invention is to improve the bumper of Roubinet by providing films of high temperature resistant thermoplastic materials between thin layers of aligned filaments supported in a suitable matrix, thus reducing interlamellar shear problems encountered in solid bumpers.

SUMMARY OF THE INVENTION

This invention is for a method of manufacturing and for an intimately nested laminated energy attenuator. The energy attenuator is manufactured by wrapping resin impregnated fibers about a mandrel, periodically inserting a high temperature resistant thermoplastic material for separation of the lamina, and curing the laminated material in the desired form. The resulting energy attenuator provides a light structure for absorbing energy by deformation and then returning to its original shape without interlamellar shear damage as found in solid structures.

The laminated energy attenuator of this invention may also be formed by forming resin impregnated fiber sheets into desired shapes by placing in a die and applying heat and pressure to cure to the desired dimensions and then assembling the matched components into a laminated energy attenuator. Separator may be added between the lamina if desired.

DRAWINGS

These and other objects of this invention will become obvious by reference to the following specification and drawing wherein:

FIG. 1 illustrates an end view of an energy absorption attenuator of present invention with phantom lines showing the flexed position.

FIG. 2 is a side view of the attenuator of FIG. 1 with sections broken away to show the laminate structure.

FIG. 3 is an enlarged view of a portion of FIG. 1.

FIG. 4 is another embodiment of the laminated energy attenuator utilizing a columnar structure.

FIG. 5 is a view substantially along line 5—5 of FIG. 4 showing mounting means of the buckling columns.

FIG. 6 is another embodiment of the laminated energy attenuators utilizing a sigma column structure.

FIG. 7 is an enlarged view of the right angle portion of FIG. 4 showing the laminated structure.

FIG. 8 is a view substantially along the line 8—8 of FIG. 7.

The preferred embodiments of this invention may be seen by referring to the drawings and now referring to FIGS. 1, 2 and 3 of the drawings, a ring type energy attenuator 10 is shown having a plurality of layers or laminas 12, 14, 16 and 18 and each lamina 12 through 18 is separated from the adjacent lamina by a film or separator 20, 22 and 24. The separators are of high temperature resistant thermoplastic materials such as nylon, polyester or polypropylene films. The separators may be eliminated between the laminas if desired.

When the energy attenuator 10 is flexed as shown in phantom lines in FIG. 1, the lamina move relative to each other and greatly reduce the effect of shear laminating encountered in solid structures.

Referring now to FIGS. 4, 5, 7 and 8, a column type laminated resilient energy attenuator 26, 26a is shown mounted between a vehicle body 28 and a vehicle bumper 38. The attenuator 26 has lamina 32 and 34 separated by a film or separator 36. One end of each of the columns 26, 26a is secured to a backing plate 38 by bolts 40 or other suitable mounting means and the backing plate 38 is secured to the vehicle body 28 by a bolt 42 or by other suitable mounting means. The other ends of columns 26, 26a are secured to the bumper 30 by bolts 44 and nuts 46 or other suitable mounting means.

Care must be exercised in designing the backing plate 38 to assure that the plate extends far enough from the attaching bolts 40 so that the flexing of the columns during application of force to the bumper will not cause the edge of the plate to act as a shear on the flexed column.

As seen in FIG. 6, a modified column structure or sigma columns 48, 48a is shown having preformed angles for providing a resilient energy attenuator having a lower initial resistance to deformation than the columns 26, 26a.

A novel method is utilized to form the laminated structure of this invention. Fiber strands such as continuous filament fiber glass or carbon is unwound under tension from a spool, then the fiber is passed into a bath of liquid resin material wherein the fiber is saturated with the resin. The resin saturated fiber is then wound on a mandrel to a predetermined thickness, a thickness of film of high temperature resistant thermoplastic material which is neither soluble in or compatible with or modified by the resin molding conditions encountered in the processing of the lamina is then placed around the lamina and another layer of resin would thereupon.

The liquid resin used to saturate the fiber and form the matrix between the fibers consists of a resilient thermoset plastic such as a product formed by reacting two mols of propylene glycol with one and one half mol maleic anhydrite and one half mol of phthallic anhydride and dissolving this reaction product into a monomer such as styrene or a vinyl ester resin which is made by esterifying a short chain epoxy with acrylic acid and dissolving this reaction product in a monomor such as styrene, which upon application of heat and pressure cures to a solid mass having sufficient strength to support a bumper and being resilient for flexing during application of an external impact force and then having the characteristic of returning to its original shape. The above specific description of the thermoset plastic is set forth for example purposes only and such specific example forms no part of the instant claimed invention.

These steps are repeated until the desired number of lamina have been formed. Then the laminated structure may be placed in an oven and cured as a ring attenuator or removed from the mandrel, cut into desired lengths and formed and cured in heated dies. By use of suitable feed mechanisms, well known in the art, a uniform winding or patterned winding may be obtained in each lamina as desired on the mandrel.

Thus, by varying the number of layers and also the thickness of the individual layers, an energy attenuator of the desired rigidity and strength may be easily fabricated. The strength of the attenuator may also be controlled by the type and size of fiber used.

Another method of manufacturing a laminated energy attenuator would involve matching dies in which sheet material of fibers impregnated with resin is cut to desired size and placed in the matching dies which form the material to the desired shape by application of pressure and then cure it by application of heat with a resulting lamina properly shaped for nesting in adjacent lamina in a laminated energy attenuator. Separators may be placed between the lamina or omitted, as desired, in this method of assembly.

What is claimed is:

1. An energy attenuator having a first attaching means for securing said attenuator to a bumper, a second attaching means for securing said attenuator to the object to be protected, said attenuator comprising a plurlity of independent and separate flexural energy absorbing layers nested for forming a laminated structure and having each of said flexural energy absorbing layers including a plurality of aligned strands spaced and positioned in a resilient thermoset plastic resin matrix and said attenuator supporting said bumper spaced from said object to be protected and extending between said object to be protected and said bumper.

2. The energy attenuator as claimed in claim 1 including spacer means between and in intimate contact with each adjacent layer, and said spacer means having a lack of adherence to and being insoluable in and unmodified by the adjacent layers.

3. The energy attenuator as claimed in claim 1 wherein said energy attenuator comprises a substantially cylindrical spring member.

4. The energy attenuator as claimed in claim 1 wherein said energy attenuator comprises a column means extending between said attaching means, said column means having substantially parallel opposed plane surfaces, said plane surfaces extending substantially at right angles from the surface of said attaching means, and said column means.

5. The energy attenuator as claimed in claim 1 wherein said energy attenuator comprises a sigma shaped member having the upper and the lower parallel members, thereof, coacting with said first and second attaching means, respectively, for securing said energy attenuator between said bumper and protected object.

* * * * *